US008641786B2

(12) United States Patent
Huisjes et al.

(10) Patent No.: US 8,641,786 B2
(45) Date of Patent: Feb. 4, 2014

(54) ROTATING KNIFE, WASHING COLUMN, AND METHOD FOR DISINTEGRATING A CRYSTAL BED IN A WASHING COLUMN

(75) Inventors: Piet Huisjes, Nijverdal (NL); Johannes Van Der Meer, Loenen aan de Vecht (NL); Michiel Nienoord, Apeldoorn (NL); Dirk Verdoes, Apeldoorn (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 572 days.

(21) Appl. No.: 12/996,318

(22) PCT Filed: Jun. 5, 2009

(86) PCT No.: PCT/NL2009/050310
§ 371 (c)(1),
(2), (4) Date: Mar. 10, 2011

(87) PCT Pub. No.: WO2009/148314
PCT Pub. Date: Dec. 10, 2009

(65) Prior Publication Data
US 2011/0146030 A1        Jun. 23, 2011

(30) Foreign Application Priority Data
Jun. 6, 2008    (EP) .................................. 08157797

(51) Int. Cl.
*B01D 9/00*        (2006.01)

(52) U.S. Cl.
USPC ........................................ 23/299; 23/313 FB

(58) Field of Classification Search
USPC ................... 23/299, 295 R, 313 FB
See application file for complete search history.

(56) References Cited

U.S. PATENT DOCUMENTS

| 1,642,122 A | 9/1927 | McMahon |
| 4,830,645 A | 5/1989 | Ghodsizadeh et al. |
| 2004/0256319 A1 | 12/2004 | Hammon et al. |

FOREIGN PATENT DOCUMENTS

| CN | 1493383 A | 5/2004 |
| CN | 2930860 Y | 8/2007 |
| EP | 0 373 720 A | 6/1990 |
| GB | 1 507 034 A | 4/1978 |
| GB | 2 023 564 A | 1/1980 |

OTHER PUBLICATIONS

Chinese Office Action mailed Feb. 22, 2013 in Chinese Application No. 200980129336.5.

*Primary Examiner* — Edward Johnson
(74) *Attorney, Agent, or Firm* — Kilpatrick Townsend & Stockholm LLP

(57) ABSTRACT

A rotating knife is disclosed for disintegrating a crystal bed formed in a washing column for processing suspension of solid particles in a liquid. The rotating knife is provided with a spoke support. The spoke support comprises at least two spokes. The relative angle of the spokes is between approximately 20° and approximately 80°.

8 Claims, 5 Drawing Sheets

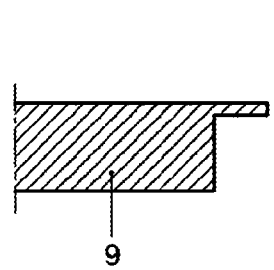
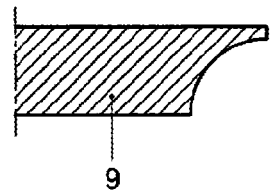
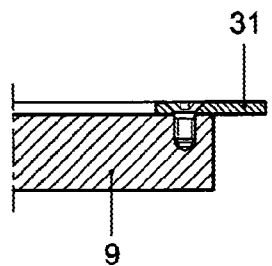
Fig. 5a   Fig. 5b   Fig. 5c
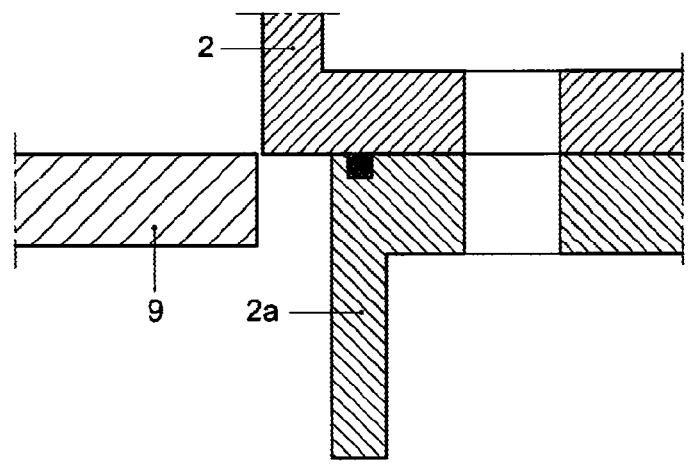
Fig. 5d

ROTATING KNIFE, WASHING COLUMN, AND METHOD FOR DISINTEGRATING A CRYSTAL BED IN A WASHING COLUMN

CROSS-REFERENCE TO REALATED APPLICATIONS

This application is a National Stage of International Application No. PCT/NL2009/050310, filed Jun. 5, 2009, and which claims the benefit of European Patent Application No. 08157797.5, filed Jun. 6, 2008, the disclosures of which are incorporated herein by reference.

The invention relates to a rotating knife for disintegrating a crystal bed formed in a washing column.

A washing column is generally known for processing a suspension of solid particles in a liquid. A washing column can also be used to separate organic crystals from a suspension in an impure melt.

Generally, in a washing column a suspension comprising e.g. a melt with solid particles therein (unmelted or crystallized) is passed through a washing column in order to separate the relatively pure solid particles from the contaminated liquid fraction (mother liquor). The washing column contains one or more filters, each of which is included in a separate pipe, which extends in the longitudinal direction through the interior of the washing column, while the suspension is supplied at one extremity of the column and moves along the pipes in the direction of the other extremity of the column. The mother liquor passes the filters and thus ends up in the pipes to be discharged. As via the filters, mother liquor is extracted from the suspension, a porous bed of particles is formed in the washing column. At the other extremity of the column, means are present for disintegrating or breaking up the bed of particles formed. The discharged solid (crystalline) material is melted and a portion of this melt is fed to the particle bed as washing liquid, in order to wash the particles in their own melt. The means for disintegrating or breaking up the crystal bed formed consist of a knife. The knife is usually embedded in a carrier that rotates. The rotating carrier with knife is therefore commonly known as a 'rotating knife'. The rotating knife is usually driven by a shaft.

WO 03/041833 discloses a rotating knife that is centrally supported on a shaft. The support can be provided with stiffeners between the rotating knife and the shaft.

A drawback of the rotating knife is that it is relatively difficult to discharge disintegrated particles of the crystal bed. Another drawback is that due to large forces, the construction of the carrier is relatively heavy.

An object of the invention is to provide a rotating knife that obviates at least one of the above-mentioned drawbacks while maintaining the advantages.

To this end, the invention provides a rotating knife for disintegrating a crystal bed formed in a washing column, wherein the rotating knife is provided with a spoke support.

By providing a rotating knife with a spoke support, the knife can be supported in a stable and reliable way. Due to the spoke support, the carrier containing the knife can be of a lighter and thus less costly construction. Also, the spoke support provides for a relatively open support in which the disintegrated particles of the crystal bed can be easily discharged.

By providing a rotating knife with a reduced circumferential side edge, the friction between the side wall of the washing column and the rotating knife caused by passing solid particles can be minimized. A rotating knife with a reduced circumferential side edge may also be seen as an independent invention.

Further advantageous embodiments are represented in the subclaims.

The invention further relates to a washing column for processing a suspension.

The invention also relates to a method for disintegrating the crystal bed in a washing column.

The invention will further be elucidated on the basis of an exemplary embodiment which is represented in a drawing. The exemplary embodiment is given by way of non-limitative illustration of the invention.

In the drawing:

FIG. 5a, FIG. 5b, FIG. 5c and FIG. 5d show a schematic side view of a knife edge according to the invention.

It is noted that the figures are only schematic representations of preferred embodiments of the invention that are given by way of non-limiting exemplary embodiments. In the figures, the same or corresponding parts are designated with the same reference numerals.

Figure 1:
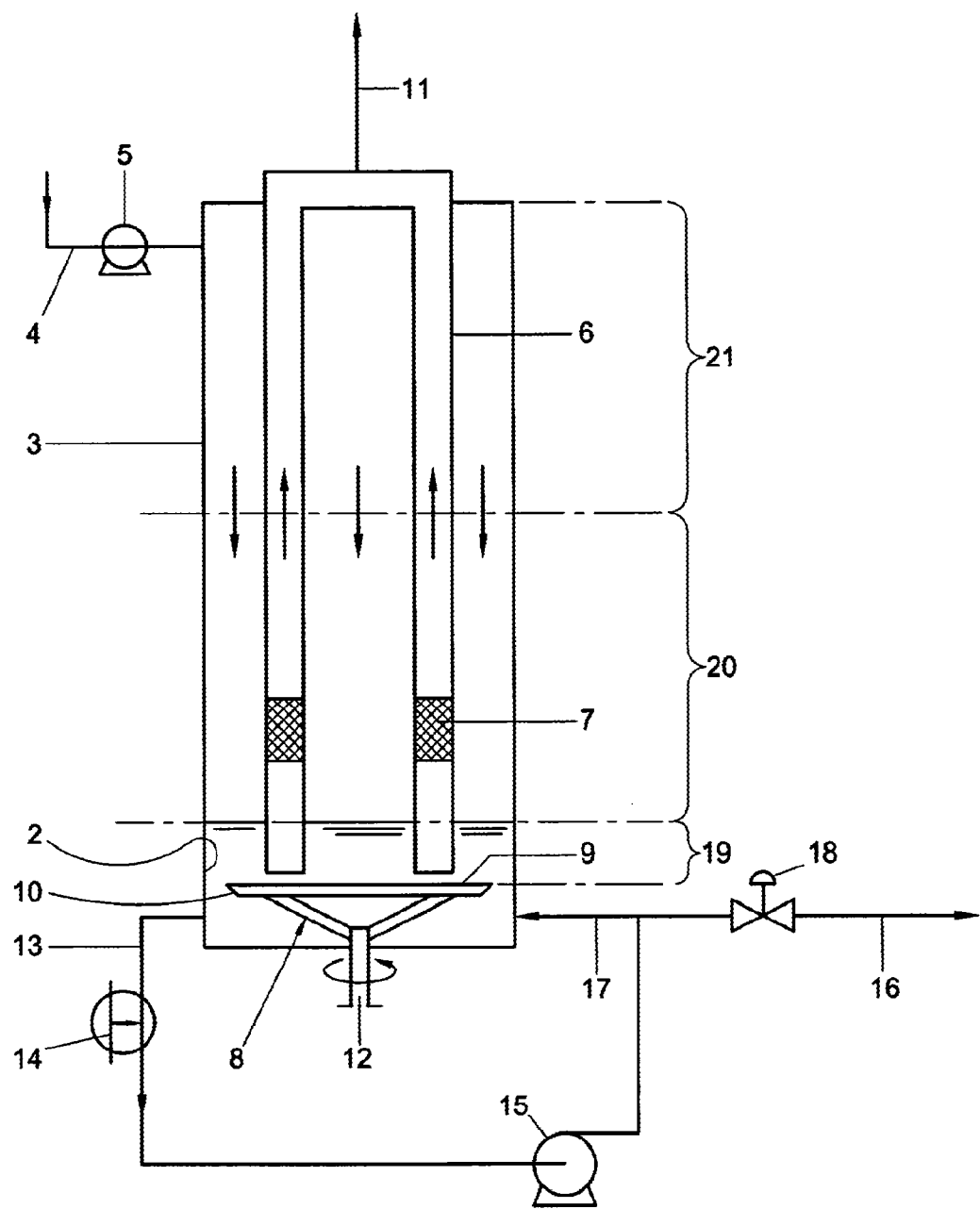
FIG. 1 shows a schematic view of an embodiment of a washing column with rotating knife according to the invention.

In FIG. 1 a washing column 3 is shown to which suspension, comprising e.g. a melt and solid particles, is fed via the line 4 by means of the pump 5. The suspension is fed to the washing column 3 at the top thereof and then flows downwards in the suspension zone 21. The washing column 3 comprises a number of pipes 6 with a filter 7. In the region of the filters 7, the liquid fraction (mother liquor) from the suspension flows into the pipes 6. The liquid fraction (mother liquor) is discharged from the pipes 6 via the line 11. The solid particles cannot pass the filters 7 and remain in the washing column 3 for forming a crystal bed in the concentration/thickening zone 20.

Figure 2:
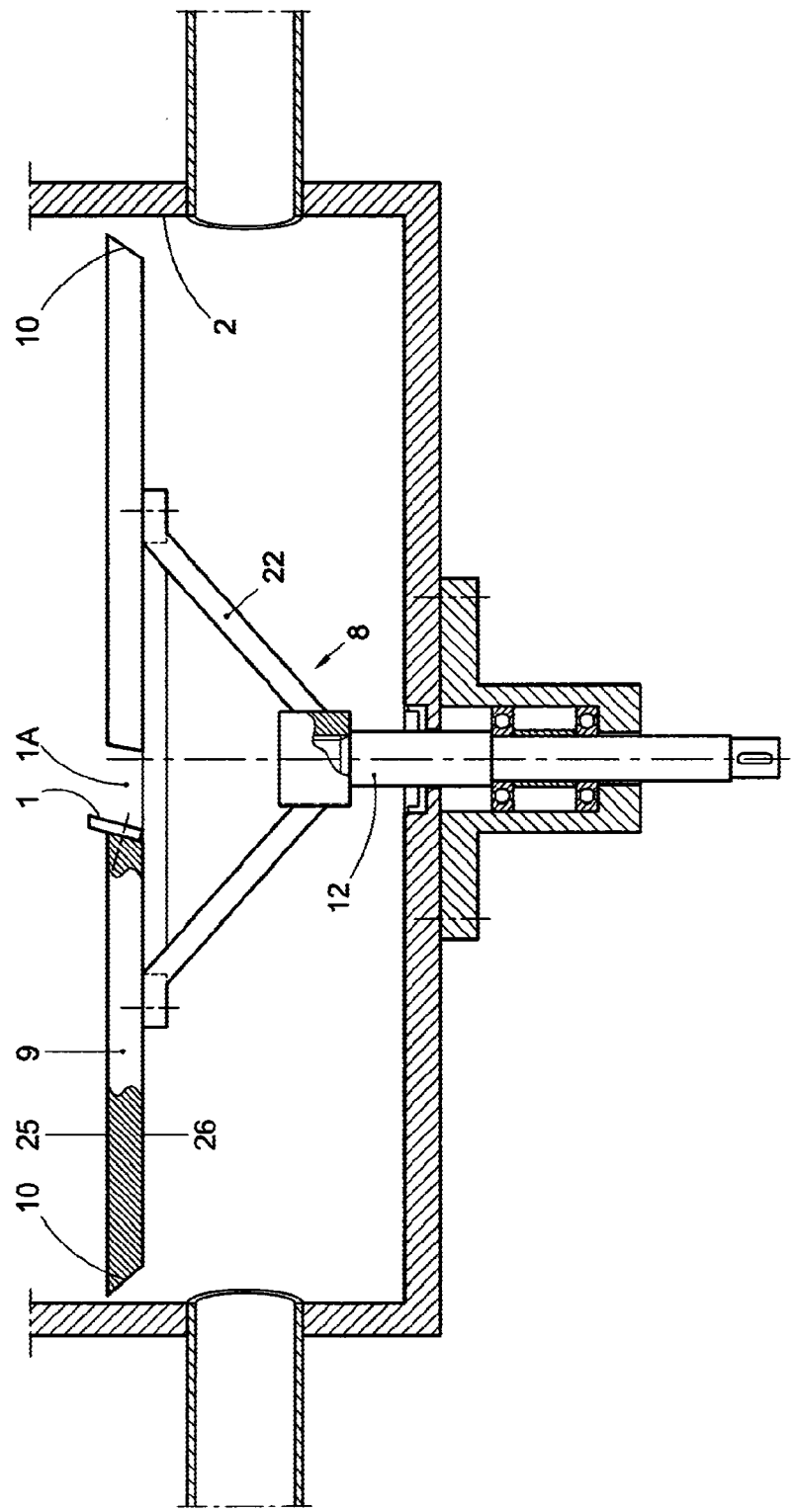
FIG. 2 shows a schematic side view of a rotating knife according to the invention.

The crystal bed is disintegrated or scraped off by the rotating knife 9. In FIG. 2 it is shown in detail how contact face 25 of the rotating knife 9 may be in contact with the crystal bed to disintegrate the crystal bed with knife blades 1 provided at the side of the contact face 25 in the rotating knife 9. The knife blades 1 scrape off particles of the crystal bed which may then pass through adjacent slots or other types of openings to allow the scraped off particles to pass through the knife 9.

According to the invention, the rotating knife 9 is provided with a spoke support 8. The spoke support 8 is arranged for mounting on a shaft 12. The shaft 12 does not provide an obstruction for the rotating knife 9 nor for the forming of the crystal bed. In this embodiment the rotating knife 9 is driven by the shaft 12. The crystal bed can be scraped off over approximately the whole surface of the rotating knife 9, so also in the centre of the rotating knife 9 and also relatively close to the side edge of the rotating knife 9.

The scraped off solid particles are transported via line 13 to a melter 14 with circulating melt. Melt is circulated by means of a pump 15. The molten scraped off particles are discharged via valve 18 and line 16. With valve 18 the pressure in the circulating melt is set at a value that forces a small fraction of the circulating melt counter currently with the moving particles into the bottom of the washing column 3. This fraction of melt serves to wash the crystalline particles in the washing zone 19, thus preventing undesired constituents of the melt from seeping through to the bottom of column 3.

Figure 3:
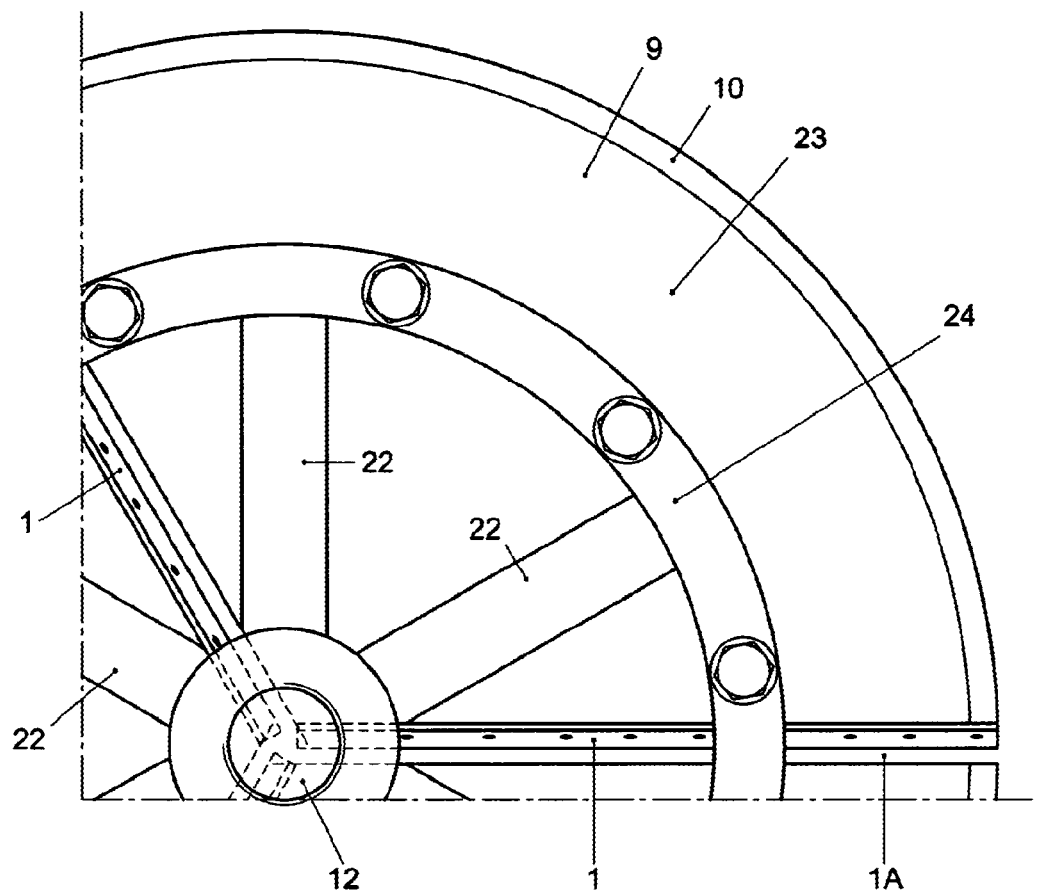
FIG. 3 shows a schematic top view of a rotating knife according to the invention.
Figure 4A:
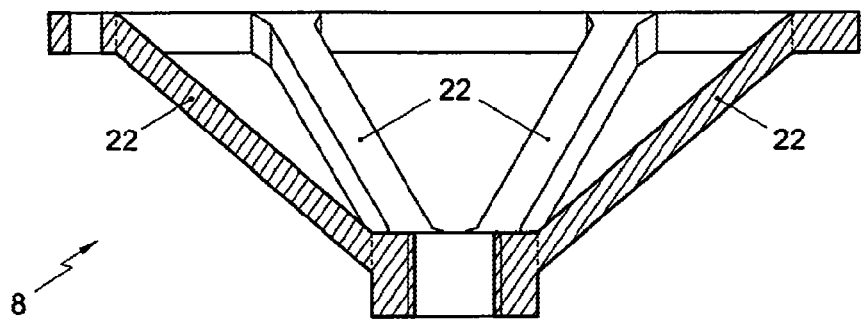
FIG. 4a and FIG. 4b show a schematic side view and top view of a spoke support according to the invention.
Figure 4B:
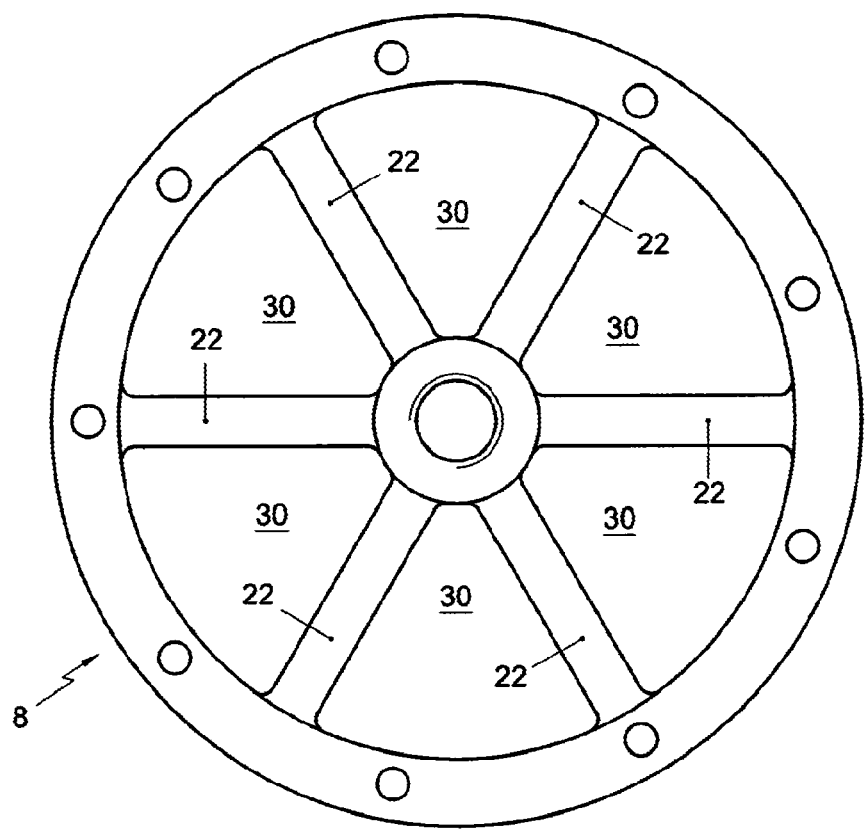

FIG. 2 and FIG. 3 show a detail of the rotating knife 9 with spoke support 8 according to the invention. The angle of the spokes 8 relative to the shaft 12 can be between approximately 20° and approximately 80°. The spoke support 8 can be provided with one or more spokes 22, as shown in FIG. 3. Preferably, the spoke support 8 has two or more spokes 22 to provide for a stable support of the rotating knife 9. The spoke support 8 is relatively open, which facilitates the discharge of disintegrated particles. The spokes 22 provide for a free space under the rotating knife 9, in particular the space under the centre region of the rotating knife 9 is free to allow disintegrated particles to pass through. The spoke support 8 as shown in FIG. 4a and FIG. 4b has six equally spaced spokes 22. The open space 30 between the spokes 22 is then more or less the same for all spokes 22.

A spoke 22 extends between the shaft 12 and the rotating knife 9, as shown in FIG. 1 and FIG. 2. At one end, the spoke 22 is arranged for connection with the rotating knife 9. The spoke 22 can be connected to the rotating knife 9 near the circumferential edge of the rotating knife 9 or at any place between the centre of the rotating knife 9 and its circumferential edge. The spoke 22 is connected to the rotating knife at a bottom face 26 of the rotating knife 9. Preferably, for a stable and efficient support, the spokes 22 are connected to the rotating knife 9 between the circumferential edge and approximately half of the radial length between the centre and the circumferential edge of the rotating knife 9. Due to the spoke support 8, the rotating knife 9 can be made of less heavy and stiff construction. A relatively light construction of the rotating knife 9 can also render a cost advantage.

At the other end of the spoke 22, the spoke 22 is arranged for connection with the shaft 12. In the embodiments shown in FIG. 1 and FIG. 2, the shaft 12 ends below the rotating knife 9 and is not directly connected to the rotating knife 9. The shaft 12 is connected to the rotating knife 9 via the spokes 22. Below the centre region of the' rotating knife 9 a space is thus created that allows the disintegrated particles to pass through the support 8 easily.

The spokes 22 can be connected to the shaft 12 and/or the rotating knife 9 by e.g. welding, bolting, screwing, or the spoke 22 can be an integral part of the spoke support 8, as e.g. shown in FIG. 4a. The spoke support 8 can then be manufactured in one piece e.g. by casting.

The top view of the rotating knife 9 in FIG. 3 shows knife blades 1 that are embedded in a carrier 23 for forming the rotating knife 9. In this embodiment, the knife blades 1 extend between the centre of the carrier 23 and the circumferential edge of the carrier 23. Several knife blades 1 are provided which are angularly displaced relative to each other in the carrier 23. Other knife blade configurations are also possible. For example, instead of one knife blade extending between the centre and the circumferential edge, several shorter knife blades may be used. The shorter knife blades can for example be placed on one radial line, or can for example be concentrated in a knife zone comprising e.g. a number of relatively short knifes and/or other scraping tools.

A knife zone can e.g. comprise a number of holes with a scraping element. Also, instead of a knife being embedded in a carrier, the knife can be provided as a discrete scraping device that is individually supported by a spoke. The carrier in which the knives are embedded can be a slotted disc, but can have a relative open structure, for example to save weight. Also, the carrier 23 can be constructed relatively light and thin and can have supporting rings 24 to provide the connection with the spokes 22 and to locally stiffen the carrier 23.

As shown in FIG. 2, the diameter of the rotating knife 9 is approximately equal to the diameter of the washing column. There is only a relatively small space between the edge of the rotating knife 9 and the side wall 2 of the washing column 3. For reducing friction between the side wall 2 and the rotating knife 9 due to scraped-off solid particles, the circumferential side edge 10 of the rotating knife 9 may have a reduced thickness. The thickness of the carrier 23 near the circumferential edge 10 becomes smaller towards the circumferential edge. Preferably, the contact face 25 of the rotating knife 9 remains approximately flat and the bottom face 26 of the rotating knife 9 extends towards the circumferential edge via a curved, beveled or stepped portion, as shown in FIG. 5a and FIG. 5b. FIG. 5c shows an alternative embodiment of a stepped edge portion of the knife 9. On the rotating knife 9a circumferential ring 31 can be placed. The angle of the reduced circumferential side edge 10 relative to the contact face 25 can be between approximately 20° and approximately 80°, and is preferably approximately 45°. The rotating knife 9 with a reduced circumferential side edge provides for less friction between knife 9, the sidewall 2 of the washing column and the scraped-off particles by offering the scraped-off particles a larger space after passage of the knife edge. Thereto, in an other embodiment shown in FIG. 5d, the side wall 2a of the washing column at the knife and/or at the support-side of the knife 9 may be provided with a larger inner diameter than the side wall 2 of the washing column at the bed-side of the knife 9.

Also, the shorter knifes can be arranged in an equally spaced distribution over the rotating knife, as well as in radial direction, as in axial direction. Also knife zones can be distributed over the rotating knife or can be combined with discrete knifes.

Many variations will be apparent to the person skilled in the art. In this embodiment, the spokes are shown as substantially straight spokes. Alternatively and/or additionally, the spokes may be curved or may comprise an angle. For example, a spoke may comprise a substantially right angle between the shaft and the rotating knife. These and other variations are understood to be comprised within the scope of the invention as defined in the following claims.

The invention claimed is:

1. A rotating knife for disintegrating a crystal bed formed in a washing column for processing suspension of solid particles in a liquid, characterized in that the rotating knife is provided with a spoke support.

2. A rotating knife according to claim 1, wherein the rotating knife comprises a reduced circumferential side edge.

3. A rotating knife according to claim 1, wherein the spoke support comprises at least two spokes.

4. A rotating knife according to claim 1, wherein the angle of the spokes is between approximately 20° and approximately 80°.

5. A rotating knife according to claim 1, wherein the diameter of the rotating knife is approximately the diameter of the washing column.

6. A rotating knife according to claim 1, wherein the spoke support is arranged for mounting on a shaft.

7. A washing column for processing suspension of solid particles in a liquid comprising a rotating knife according to claim 1.

8. A method for processing suspension of solid particles in a liquid in a washing column, comprising disintegrating the crystal bed formed in the washing column using a rotating knife provided with a spoke support.

* * * * *

UNITED STATES PATENT AND TRADEMARK OFFICE
CERTIFICATE OF CORRECTION

PATENT NO. : 8,641,786 B2  Page 1 of 1
APPLICATION NO. : 12/996318
DATED : February 4, 2014
INVENTOR(S) : Huisjes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this
Twenty-second Day of September, 2015

Michelle K. Lee
*Director of the United States Patent and Trademark Office*